Patented Nov. 13, 1951

2,574,519

UNITED STATES PATENT OFFICE 2,574,519

CYCLOHEXIMIDE AND PROCESS FOR ITS PRODUCTION

Alma J. Whiffen and Robert L. Emerson, Kalamazoo, Mich., and Nestor Bohonos, La Fayette, Ind., assignors to The Upjohn Company, Kalamazoo, Mich., a corporation of Michigan No Drawing. Application October 19, 1946, Serial No. 704,530

2 Claims. (Cl. 260—294.7)

1. This invention relates to a new and useful biosynthetic antimicrobial substance, and is more particularly concerned with an antibiotic having a high activity toward *Cryptococcus neoformans* and certain plant pathogenic fungi, and with a method for its preparation.

2. It is known that there can be obtained an antibiotic from a *Streptomyces griseus* fermented medium comprising glucose, meat extract, peptone and sodium chloride, characterised by its water solubility, ether insolubility, chloroform insolubility and acid instability. (Waksman et al., Proc. Soc. Biol. Med. 55, 66 (1940), and Proc. Staff Mayo Clinic 19, 537 (1944).) This antibiotic is characterised further by its high activity toward *Bacillus subtilis*, *Staphylococcus aureus* and *Escherichia coli*, as well as by its low activity toward *Saccharomyces cerevisiae*, *Cryptococcus neoformans*, and *Rhodotorula* sp. This antibiotic has been designated "Streptomycin."

3. The customary and usual procedures for the isolation of streptomycin from beers containing the same apparently have, until our discovery, destroyed or prevented the isolation of the product with which the present invention is concerned. The presence of this highly active antibiotic agent has never been observed previous to our discovery of the same. By the process of our invention we are now able to isolate a new antibiotic agent with exceptionally high activity towards *C. neoformans*, and to purify the same from other contaminants, including streptomycin.

4. *Cryptococcus neoformans* is a pathogenic yeast which is the causal organism for a disorder known as cryptococcosis (Manual of Clinical Mycology (Military Medical Manuals of the National Research Council) Chap. VII, pp. 111–126, W. B. Saunders Co., Philadelphia, 1945). The infection is usually found in the eastern United States and westward across the Southern States from Florida to California. The local cutaneous or subcutaneous lesions resulting from the infection may heal slowly, or the infection may spread to the central nervous system causing death, which usually occurs within three to six months. Although the antibiotic of the present invention has a particularly high antibiotic activity toward *Cryptococcus neoformans*, its use for clinical treatment of humans is contraindicated because of its high toxicity. The antibiotic, however, is useful for application to plants to control and destroy certain plant pathogenic fungi, as summarized in the article by J. R. Vaughn and C. L. Hamner, in Proceedings of the American Society for Horticultural Science, 1949, vol. 54, pages 435 to 437 (Journal No. 1111 of the Michigan Agricultural Experiment Station).

5. It is, therefore, an object of the present invention to provide a new antimicrobial substance. A further object of the invention is the provision of a new antibiotic with a high activity toward *Cryptococcus neoformans* and *Saccharomyces cerevisiae*. An additional object of the invention is the provision of a new water-, ether- and chloroform-soluble, acid-stable biosynthetic antimicrobial substance. A further object of the invention is the provision of a method whereby the antibiotic may be obtained. Other objects of the present invention will become apparent hereinafter.

6. The process of our invention consists essentially in the extraction of the beer from *S. griseus* fermentation, either following removal, or without removal, of the mycelium, by the employment of an appropriate solvent. Representative solvents which have been found useful for the extraction from *S. griseus* beers include chloroform, butyl alcohol and ethyl acetate, although others may be employed, if desired.

7. The antibiotic may be recovered from the solvent employed, either by simple evaporation of the solvent in vacuo, or by adsorption on a suitable adsorbent followed by elution with a solvent. As adsorbents we have found activated clay especially efficient. Solvents which have been found especially useful for the purpose of elution include methanol; 0.05 N hydrochloric acid in methanol; or water. The active material may be recovered in a concentrated form by evaporation of solvent, preferably, although not necessarily, under subatmospheric pressure and at a temperature as low as practicable. Other conventional means of recovery from solvents may be employed and will be apparent to one skilled in the art.

8. The product of our invention is a water-soluble, ether-soluble, chloroform-soluble antibiotic characterised by its high activity toward *Saccharomyces cerevisiae* and *Cryptococcus neoformans*, obtained from a *S. griseus* fermented medium, such as one comprising glucose, meat extract, peptone, sodium chloride and water. The new antibiotic, in its highly purified state, exists as a white crystalline solid.

9. The bio-synthetic product of our invention is relatively heat stable and acid stable when compared with other material obtained from *S.*

*griseus* fermentation. The product of our invention is destroyed by boiling in aqueous solution at pH 7.0 for one hour, but no loss in activity is apparent after a similar treatment for fifteen minutes. At a pH of 2.0, the product of our invention has been found resistant to destruction upon boiling in aqueous solution for over sixty minutes. Seitz filtration does not remove the new antibiotic from solution.

10. The product of our invention may be recognized by its water-solubility, ether-solubility, chloroform-solubility, acid-stability, and by its activity toward *Saccharomyces cerevisiae*, *Cryptococcus neoformans*, and *Rhodotorula* sp. While streptomycin is also obtained from the *Streptomyces griseus* fermentation medium, this antibiotic is characterised by its water-solubility, ether-insolubility, chloroform-insolubility, and acid-instability, as well as by its low activity toward *Saccharomyces cerevisiae* and *Cryptococcus neoformans*, so that there is ample data by which to differentiate between the two bio-synthetic anti-microbial substances. The product of our invention may be further differentiated from streptomycin by its low activity toward *B. subtilis* and *S. aureus*.

The antibiotic of this invention has been designated "cycloheximide" and it has been shown to have an empirical formula of $C_{15}H_{23}NO_4$ and to be beta-[2-(3,5-dimethyl-2-oxocyclohexyl)-2-hydroxyethyl]-glutarimide having the following structural formula:

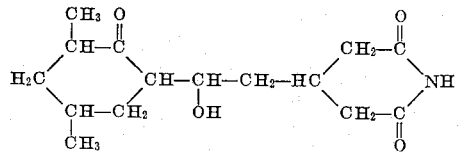

according to Kornfeld, Jones and Parke, J. A. C. S. 1949, vol. 71, pages 150 to 159. Its melting point after further purification is 119.5–121 degrees centigrade and its optical rotation, $[\alpha]_D^{29}$ is minus 3.38 ($c=9.47$ in ethanol). This antibiotic is distinctly different from streptocin, the trichomonadicidal substance isolated from mycelium of *Streptomyces griseus* by Selman A. Waksman et al., Proc. Soc. Exper. Biol. and Med., 1949, vol. 70, page 308.

11. The following examples are given only to illustrate the practise of the present invention and are not to be construed as limiting the same.

I

A fermentation medium was prepared from one liter of water, ten grams of glucose, five grams of meat extract (Difco), five grams of peptone, and five grams of sodium chloride. Portions of one hundred milliliters each were distributed in several flasks of five hundred milliliter capacity, after which the flasks were cotton-plugged and autoclaved for thirty minutes at fifteen pounds pressure. Each flask was then inoculated with one milliliter of a suspension of *Streptomyces griseus* spores and placed in a reciprocating shaker. The various flasks were incubated at a temperature of twenty-four degrees centigrade for varying periods. It was determined that maximum production of the antibiotic occurs between seventy-two and ninety-six hours.

II

Nineteen hundred milliliters of a fermentation beer prepared as in Example I, after fermentation with *S. griseus*, was extracted with fourteen hundred milliliters of chloroform. The chloroform was removed in vacuo and eleven hundred seventy-five milligrams of our new antibiotic was thus obtained.

III

Two hundred milliliters of a chloroform extract, prepared as in Example II, was shaken with seventy-five hundredths of a gram of activated clay (superfiltrol; Filtrol Corporation, Los Angeles, California). Ninety per cent of the active substance was adsorbed on the earth.

IV

Forty milliliters of a chloroform extract, prepared as in Example II, was shaken with 0.15 gram of superfiltrol. The superfiltrol adsorbate was removed and eluted once with five milliliters of water. Twenty-six per cent of the active substance present in the chloroform extract was thus recovered.

V

In the same manner as in Example IV, the superfiltrol adsorbate was eluted with methanol. Twenty per cent of the active antibiotic present in the original extract was removed in one treatment.

12. The new antibiotic exhibits a high order of activity against a number of yeasts and but very little activity against bacteria. Activity against fungi was determined by diluting the antibiotic in an agar medium (Bacto-Peptone 0.5%, Glucose 1.0%, Difco yeast extract 0.1%, agar 2.0%; adjusted to pH 8.0 before autoclaving) onto which spore suspensions of the fungi were streaked. The plates were incubated at 30 degrees centigrade for 72 hours and the highest dilution giving complete inhibition of the growth of the test organism was recorded. The activity against the bacteria was determined by diluting the antibiotic in broth (Bacto-Peptone 0.75%, Difco yeast extract 0.25%; pH adjusted to 7.25) and inoculating the tubes with bacterial test organisms. The highest dilution giving complete inhibition of growth was read after 24 hours of incubation at 30 degrees centigrade. The activity of streptomycin against the same test organisms was determined under identical conditions. The results of this comparison are recorded in Table 1.

*Table I*

[The highest dilution of 1 gram of cycloheximide or streptomycin (purity, 708 units per milligram), giving complete inhibition of growth of the test organisms.]

| Test Organism | Cycloheximide | Streptomycin |
|---|---|---|
| *Saccharomyces cerevisiae* ATCC 918 | 2,500,000 | <1,000 |
| *Cryptococcus neoformans* | 1,300,000 | <1,000 |
| *Rhodotorula* sp. | 1,300,000 | 1,000 |
| *Phialophora verrucosa* | 20,000 | <1,000 |
| *Monosporium apiospermum* | 20,000 | <1,000 |
| *Microsporum audouini* | 3,200 | 1,000 |
| *Histoplasma capsulatum* | 3,200 | 1,000 |
| *Hormodendrum pedrosoi* #275 | 20,000 | <1,000 |
| *Epidermophyton floccosum* | <10,000 | <1,000 |
| *Trichophyton rubrum* | <10,000 | <1,000 |
| *Hormodendron compactum* | <10,000 | <1,000 |
| *Nocardia asteroides* #653 | <10,000 | <1,000 |
| *Coccidioides immitis* #819 | <10,000 | <1,000 |
| *Sporotrichum schenkii* | <10,000 | <1,000 |
| *Blastomyces dermatitidis* #930 | <10,000 | <1,000 |
| *Geotrichum* sp. | <10,000 | <1,000 |
| *Candida albicans* | <10,000 | <1,000 |
| *Bacillus subtilis* | <10,000 | 28,000,000 |
| *Staphylococcus aureus* | <10,000 | 21,000,000 |
| *Escherichia coli* | <10,000 | 3,500,000 |
| *Pseudomonas aeruginosa* ATCC 9027 | <10,000 | 350,000 |

If desired, activated carbon, such as Darco G-60, may be employed to adsorb the active material, and such adsorption may take the form of the following example, which illustrates to some extent the relative effectiveness of the eluting solvents employed.

VI

Activated carbon, Darco G-60 (2.4 grams) was added to 120 milliliters of S. griseus beer. About 98 per cent of the activity was adsorbed. Two 50-milligram portions of the Darco were eluted with 10 milliliters of one of the following eluates:

1. MeOH; 2. MeOH plus 0.05 normal HCl; 3. 50 per cent MeOH; 4. Butyl alcohol; 5. Ethyl acetate.

Eluates 2, 4 and 5 contained between 60 and 80 per cent of the active material. Eluates 1 and 3 contained about 20 per cent of the activity, none being without effect.

Reference is made to the application of Byron E. Leach, Serial No. 729,201, in which improved methods for the recovery of the antibiotic substance cycloheximide are disclosed and claimed.

Modifications may be made in carrying out the present invention without departing from the spirit and scope thereof, and it is to be understood that we limit ourselves only by the appended claims.

We claim:

1. A process for the production of the antibiotic substance cycloheximide which comprises the aerobic cultivation of a substantially pure sporulating culture of a cycloheximide-producing strain of Streptomyces griseus on a carbohydrate-containing medium, extraction of the fermented culture medium with chloroform, adsorption of the cycloheximide from the solvent extract with an adsorbent of the group consisting of adsorbent carbons and clays and elution of the adsorbed cycloheximide from the adsorbent with a solvent of the group consisting of water, methanol, butanol, ethyl acetate and mixtures thereof.

2. A process for the production of the antibiotic substance cycloheximide which comprises the aerobic cultivation of a substantially pure sporulating culture of a cycloheximide-producing strain of Streptomyces griseus on a carbohydrate-containing medium, extraction of the fermented culture medium with chloroform, adsorption of the cycloheximide from the chloroform extract with an adsorbent of the group consisting of adsorbent carbons and clays and elution of the adsorbed cycloheximide from the adsorbent with an acidified aqueous solution of methanol.

ALMA J. WHIFFEN.
ROBERT L. EMERSON.
NESTOR BOHONOS.

REFERENCES CITED

The following references are of record in the file of this patent:

UNITED STATES PATENTS

| Number | Name | Date |
|---|---|---|
| 2,378,876 | Waksman | June 19, 1945 |

OTHER REFERENCES

Quarendon, Manuf. Chemist and Manuf. Perfumer, vol. 14, pp. 251–254 (1943).

Waksman, J. Bact., vol. 46, pp. 299–310 (1943).

Schatz et al., Proc. Soc. Exp. Biol. Med., vol. 57, pp. 244–248 (1944).

Waksman et al., J. Am. Pharm. Assoc. (Scientific Edition), vol. 34, pp. 276–277 (1945).

Carter et al., J. Biol. Chem., vol. 160, pp. 337–342 (1945).

Waksman, J. Bact., 51, pp. 753–759, rec'd. for publ., Feb. 28, 1946.

Schatz et al., Proc. Soc. Exp. Biol. Med., vol. 62, pp. 143–145, June, 1946.